US 8,005,065 B2

(12) United States Patent
Jia et al.

(10) Patent No.: US 8,005,065 B2
(45) Date of Patent: Aug. 23, 2011

(54) KEEP-ALIVE FOR WIRELESS NETWORKS

(75) Inventors: Zhanfeng Jia, Belmont, CA (US);
David Jonathan Julian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 820 days.

(21) Appl. No.: 11/853,668

(22) Filed: Sep. 11, 2007

(65) Prior Publication Data

US 2009/0067407 A1   Mar. 12, 2009

(51) Int. Cl.
*H04J 3/06* (2006.01)
(52) U.S. Cl. ....................................................... 370/350
(58) Field of Classification Search ........... 370/210–339
See application file for complete search history.

(56) References Cited

U.S. PATENT DOCUMENTS

| | | |
|---|---|---|
| 5,687,169 A | 11/1997 | Fullerton |
| 5,764,696 A | 6/1998 | Barnes et al. |
| 5,812,081 A | 9/1998 | Fullerton |
| 5,832,035 A | 11/1998 | Fullerton |
| 5,907,427 A | 5/1999 | Scalora et al. |
| 5,952,956 A | 9/1999 | Fullerton |
| 5,960,031 A | 9/1999 | Fullerton et al. |
| 5,963,581 A | 10/1999 | Fullerton et al. |
| 5,969,663 A | 10/1999 | Fullerton et al. |
| 5,995,534 A | 11/1999 | Fullerton et al. |
| 6,031,862 A | 2/2000 | Fullerton et al. |
| 6,091,374 A | 7/2000 | Barnes |
| 6,111,536 A | 8/2000 | Richards et al. |
| 6,133,876 A | 10/2000 | Fullerton et al. |
| 6,177,903 B1 | 1/2001 | Fullerton et al. |
| 6,212,175 B1 | 4/2001 | Harsch |
| 6,218,979 B1 | 4/2001 | Barnes et al. |
| 6,295,019 B1 | 9/2001 | Richards et al. |
| 6,297,773 B1 | 10/2001 | Fullerton et al. |
| 6,300,903 B1 | 10/2001 | Richards et al. |
| 6,304,623 B1 | 10/2001 | Richards et al. |

(Continued)

FOREIGN PATENT DOCUMENTS

EP   1569404   8/2005

(Continued)

OTHER PUBLICATIONS

Jetcheva et al, Adaptive Demand-Driven Multicast Routing in Multi-Hop Wireless Ad Hoc Networks, ACM, 12 pages, 2001.*

(Continued)

*Primary Examiner* — Frank Duong
(74) *Attorney, Agent, or Firm* — Dang M. Vo

(57) ABSTRACT

A transmitting device transmits data to one or more receiving devices. At least one of the receiving devices transmits a keep-alive to the transmitting device. The keep-alive is transmitted at a reduced rate relative to the data transmission rate. In some implementations multiple receiving devices may transmit keep-alives. In these cases, each receiving device may transmit its keep-alives according to a schedule to prevent or reduce the likelihood of overlapping keep-alives. In some implementations a receiving device may be selected to transmit keep-alives. Here, if the selected receiving device stops transmitting keep-alives another receiving device is selected to transmit keep-alives. Through the use of the above techniques, the transmitting device need not keep track of which receiving devices are listening to the data transmission. Rather, the transmitting device may simply stop transmitting in the event that it no longer receives keep-alives.

107 Claims, 8 Drawing Sheets

U.S. PATENT DOCUMENTS

| | | |
|---|---|---|
| 6,351,652 B1 | 2/2002 | Finn et al. |
| 6,354,946 B1 | 3/2002 | Finn |
| 6,400,307 B2 | 6/2002 | Fullerton et al. |
| 6,400,329 B1 | 6/2002 | Barnes |
| 6,421,389 B1 | 7/2002 | Jett et al. |
| 6,430,208 B1 | 8/2002 | Fullerton et al. |
| 6,437,756 B1 | 8/2002 | Schantz |
| 6,462,701 B1 | 10/2002 | Finn |
| 6,466,125 B1 | 10/2002 | Richards et al. |
| 6,469,628 B1 | 10/2002 | Richards et al. |
| 6,483,461 B1 | 11/2002 | Matheney et al. |
| 6,489,893 B1 | 12/2002 | Richards et al. |
| 6,492,904 B2 | 12/2002 | Richards |
| 6,492,906 B1 | 12/2002 | Richards et al. |
| 6,501,393 B1 | 12/2002 | Richards et al. |
| 6,504,483 B1 | 1/2003 | Richards et al. |
| 6,512,455 B2 | 1/2003 | Finn et al. |
| 6,512,488 B2 | 1/2003 | Schantz |
| 6,519,464 B1 | 2/2003 | Santhoff et al. |
| 6,529,568 B1 | 3/2003 | Richards et al. |
| 6,538,615 B1 | 3/2003 | Schantz |
| 6,539,213 B1 | 3/2003 | Richards et al. |
| 6,549,567 B1 | 4/2003 | Fullerton |
| 6,552,677 B2 | 4/2003 | Barnes et al. |
| 6,556,621 B1 | 4/2003 | Richards et al. |
| 6,560,463 B1 | 5/2003 | Santhoff |
| 6,571,089 B1 | 5/2003 | Richards et al. |
| 6,573,857 B2 | 6/2003 | Fullerton et al. |
| 6,577,691 B2 | 6/2003 | Richards et al. |
| 6,585,597 B2 | 7/2003 | Finn |
| 6,593,886 B2 | 7/2003 | Schantz |
| 6,606,051 B1 | 8/2003 | Fullerton et al. |
| 6,611,234 B2 | 8/2003 | Fullerton et al. |
| 6,614,384 B2 | 9/2003 | Hall et al. |
| 6,621,462 B2 | 9/2003 | Barnes |
| 6,636,566 B1 | 10/2003 | Roberts et al. |
| 6,636,567 B1 | 10/2003 | Roberts et al. |
| 6,636,573 B2 | 10/2003 | Richards et al. |
| 6,642,903 B2 | 11/2003 | Schantz |
| 6,661,342 B2 | 12/2003 | Hall et al. |
| 6,667,724 B2 | 12/2003 | Barnes et al. |
| 6,670,909 B2 | 12/2003 | Kim |
| 6,671,310 B1 | 12/2003 | Richards et al. |
| 6,674,396 B2 | 1/2004 | Richards et al. |
| 6,677,796 B2 | 1/2004 | Brethour et al. |
| 6,700,538 B1 | 3/2004 | Richards |
| 6,710,736 B2 | 3/2004 | Fullerton et al. |
| 6,717,992 B2 | 4/2004 | Cowie et al. |
| 6,748,040 B1 | 6/2004 | Johnson et al. |
| 6,750,757 B1 | 6/2004 | Gabig, Jr. et al. |
| 6,759,948 B2 | 7/2004 | Grisham et al. |
| 6,760,387 B2 | 7/2004 | Langford et al. |
| 6,762,712 B2 | 7/2004 | Kim |
| 6,763,057 B1 | 7/2004 | Fullerton et al. |
| 6,763,282 B2 | 7/2004 | Glenn et al. |
| 6,774,846 B2 | 8/2004 | Fullerton et al. |
| 6,774,859 B2 | 8/2004 | Schantz et al. |
| 6,778,603 B1 | 8/2004 | Fullerton et al. |
| 6,781,530 B2 | 8/2004 | Moore |
| 6,782,048 B2 | 8/2004 | Santhoff |
| 6,788,730 B1 | 9/2004 | Richards et al. |
| 6,822,604 B2 | 11/2004 | Hall et al. |
| 6,823,022 B1 | 11/2004 | Fullerton et al. |
| 6,836,223 B2 | 12/2004 | Moore |
| 6,836,226 B2 | 12/2004 | Moore |
| 6,845,253 B1 | 1/2005 | Schantz |
| 6,847,675 B2 | 1/2005 | Fullerton et al. |
| 6,879,878 B2 | 4/2005 | Glenn et al. |
| 6,882,301 B2 | 4/2005 | Fullerton |
| 6,895,034 B2 | 5/2005 | Nunally et al. |
| 6,900,732 B2 | 5/2005 | Richards |
| 6,906,625 B1 | 6/2005 | Taylor et al. |
| 6,907,244 B2 | 6/2005 | Santhoff et al. |
| 6,912,240 B2 | 6/2005 | Kumar et al. |
| 6,914,949 B2 | 7/2005 | Richards et al. |
| 6,917,284 B2 | 7/2005 | Grisham et al. |
| 6,919,838 B2 | 7/2005 | Santhoff |
| 6,922,166 B2 | 7/2005 | Richards et al. |
| 6,922,177 B2 | 7/2005 | Barnes et al. |
| 6,925,109 B2 | 8/2005 | Richards et al. |
| 6,933,882 B2 | 8/2005 | Fullerton |
| 6,937,639 B2 | 8/2005 | Pendergrass et al. |
| 6,937,663 B2 | 8/2005 | Jett et al. |
| 6,937,667 B1 | 8/2005 | Fullerton et al. |
| 6,937,674 B2 | 8/2005 | Santhoff et al. |
| 6,947,492 B2 | 9/2005 | Santhoff et al. |
| 6,950,485 B2 | 9/2005 | Richards et al. |
| 6,954,480 B2 | 10/2005 | Richards et al. |
| 6,956,840 B1 * | 10/2005 | Proctor, Jr. ............... 370/342 |
| 6,959,031 B2 | 10/2005 | Haynes et al. |
| 6,959,032 B1 | 10/2005 | Richards et al. |
| 6,963,727 B2 | 11/2005 | Shreve |
| 6,980,613 B2 | 12/2005 | Krivokapic |
| 6,989,751 B2 | 1/2006 | Richards |
| 7,015,793 B2 | 3/2006 | Gabig, Jr. et al. |
| 7,020,224 B2 | 3/2006 | Krivokapic |
| 7,027,425 B1 | 4/2006 | Fullerton et al. |
| 7,027,483 B2 | 4/2006 | Santhoff et al. |
| 7,027,493 B2 | 4/2006 | Richards |
| 7,030,806 B2 | 4/2006 | Fullerton |
| 7,042,417 B2 | 5/2006 | Santhoff et al. |
| 7,046,187 B2 | 5/2006 | Fullerton et al. |
| 7,046,618 B2 | 5/2006 | Santhoff et al. |
| 7,069,111 B2 | 6/2006 | Glenn et al. |
| 7,075,476 B2 | 7/2006 | Kim |
| 7,079,827 B2 | 7/2006 | Richards et al. |
| 7,099,367 B2 | 8/2006 | Richards et al. |
| 7,099,368 B2 | 8/2006 | Santhoff et al. |
| 7,129,886 B2 | 10/2006 | Hall et al. |
| 7,132,975 B2 | 11/2006 | Fullerton et al. |
| 7,145,954 B1 | 12/2006 | Pendergrass et al. |
| 7,148,791 B2 | 12/2006 | Grisham et al. |
| 7,151,490 B2 | 12/2006 | Richards |
| 7,167,525 B2 | 1/2007 | Santhoff et al. |
| 7,170,408 B2 | 1/2007 | Taylor et al. |
| 7,184,938 B1 | 2/2007 | Lansford et al. |
| 7,190,722 B2 | 3/2007 | Lakkis et al. |
| 7,190,729 B2 | 3/2007 | Siwiak |
| 7,206,334 B2 | 4/2007 | Siwiak |
| 7,209,724 B2 | 4/2007 | Richards et al. |
| 7,230,980 B2 | 6/2007 | Langford et al. |
| 7,239,277 B2 | 7/2007 | Fullerton et al. |
| RE39,759 E | 8/2007 | Fullerton |
| 7,256,727 B2 | 8/2007 | Fullerton et al. |
| 7,271,779 B2 | 9/2007 | Hertel |
| 7,720,989 B2 * | 5/2010 | Dunk ........................ 709/232 |
| 2002/0093948 A1 * | 7/2002 | Dertz et al. ............... 370/355 |
| 2007/0140193 A1 | 6/2007 | Dosa et al. |
| 2008/0025258 A1 * | 1/2008 | Lefevre et al. ............ 370/330 |
| 2008/0130560 A1 * | 6/2008 | Khandekar et al. ....... 370/329 |

FOREIGN PATENT DOCUMENTS

| | | |
|---|---|---|
| WO | WO2004093452 | 10/2004 |

OTHER PUBLICATIONS

Moustafa et al, Multicast Routing in Mobile Ad Hoc Networks, Kluwer Academic Publishers, 24 pages, 2004.*

"RFC1122, 4.2.3.6 TCP Keep-Alives" Internet Engineering Task Force. XX, XX, Oct. 1, 1989, pp. 101-102, XP002288037.

European Search Report—EP08006479, European Search Authority—The Hague—Jan. 28, 2009.

International Search Report—PCT/US08/075901, International Search Authority—European Patent Office—Feb. 4, 2009.

Written Opinion—PCT/US08/075901, International Search Authority—European Patent Office—Feb. 4, 2009.

* cited by examiner

KEEP-ALIVE FOR WIRELESS NETWORKS

BACKGROUND

1. Field

This application relates generally to wireless communication and more specifically, but not exclusively, to a keep-alive indication that may be used to maintain data transmission.

2. Background

A communication device may establish and maintain communication with another communication device in a variety of ways. For example, for broadcast communication a transmitting device may unilaterally transmit a stream of data whereby any number of receiving devices may be free to listen to the data stream at any time. In contrast, for multicast communication two or more devices may cooperate to establish communication where participation in the communication is limited to those particular devices.

In these and other forms of communication systems, once communication commences between devices, a given device may or may not keep track of whether another device is still actively participating in the communication. For example, in some communication systems a device that is not actively transmitting may be configured to periodically transmit keep-alive messages to other devices. In this way, any device that receives the keep-alive messages will be informed that the other device is still participating in the communication (e.g., receiving data). As a result, the device that receives the keep-alive messages may continue communicating with (e.g., transmitting data to) the other device. Conversely, if keep-alive messages are not received from a given device for a certain period of time, communication with that device may be terminated. Thus, such systems may make efficient use of the available system bandwidth since a transmission may only occur when another device is listening to the transmission.

In contrast, in a communication system such as a broadcast system the broadcasting device may transmit regardless of whether any receiving devices are currently receiving the transmission. That is, the broadcasting device may simply continue its transmission until the completion of the event being broadcast. Thus, in this case a receiving device need not coordinate with the transmitting device to receive the broadcast. Rather, the receiving device may elect to listen or not listen to the broadcast at will. A potential advantage of this type of system is that little or no overhead may be needed to establish communication between devices. However, such a system may not utilize bandwidth efficiently since the broadcasting device may continue to transmit even when there are no receivers listening to the transmission.

SUMMARY

A summary of sample aspects of the disclosure follows. It should be understood that any reference to aspects herein may refer to one or more aspects of the disclosure.

The disclosure relates in some aspects a communication system where a device transmits data to one or more other devices. In various scenarios, the data transmission may comprise a multicast transmission, a unicast transmission, or a broadcast transmission.

The disclosure relates in some aspects to a keep-alive scheme where keep-alives are used to prevent the termination of data transmissions (e.g., a particular data stream). Here, to save power or for other reasons, a transmitting device may be configured to terminate its transmissions if it determines that no receiving devices are listening to the transmissions. Thus, to prevent termination of the transmissions one or more of the receiving devices that intend to keep listening to the transmissions may transmit keep-alives to the transmitting device. Advantageously, the transmitting device need not keep track of which receiving devices are currently listening to the transmissions. Rather, the transmitting device may simply continue transmitting if it receives a keep-alive from any receiving device. Alternatively, the transmitting device may terminate its transmissions in the event it is no longer receiving keep-alives from any receiving device.

In some aspects a transmitting device may conserve power by monitoring for keep-alives from a selected receiving device. For example, the selected receiving device may transmit keep-alives according to a set schedule (e.g., periodically). In this case, the transmitting device need only monitor for the keep-alives at the times designated by the schedule. In the event the keep-alives are no longer being received from the selected receiving device, the transmitting device may monitor for keep-alives from another selected receiving device.

In some aspects more than one receiving device may transmit keep-alives. In this case, each of the receiving devices may transmit its keep-alives according to a set schedule. In this way, concurrent transmissions of keep-alives may be avoided or the likelihood of such concurrent transmissions may be reduced.

BRIEF DESCRIPTION OF THE DRAWINGS

These and other features, aspects and advantages of the disclosure will be more fully understood when considered with respect to the following detailed description, appended claims and accompanying drawings, wherein:

Figure 1:
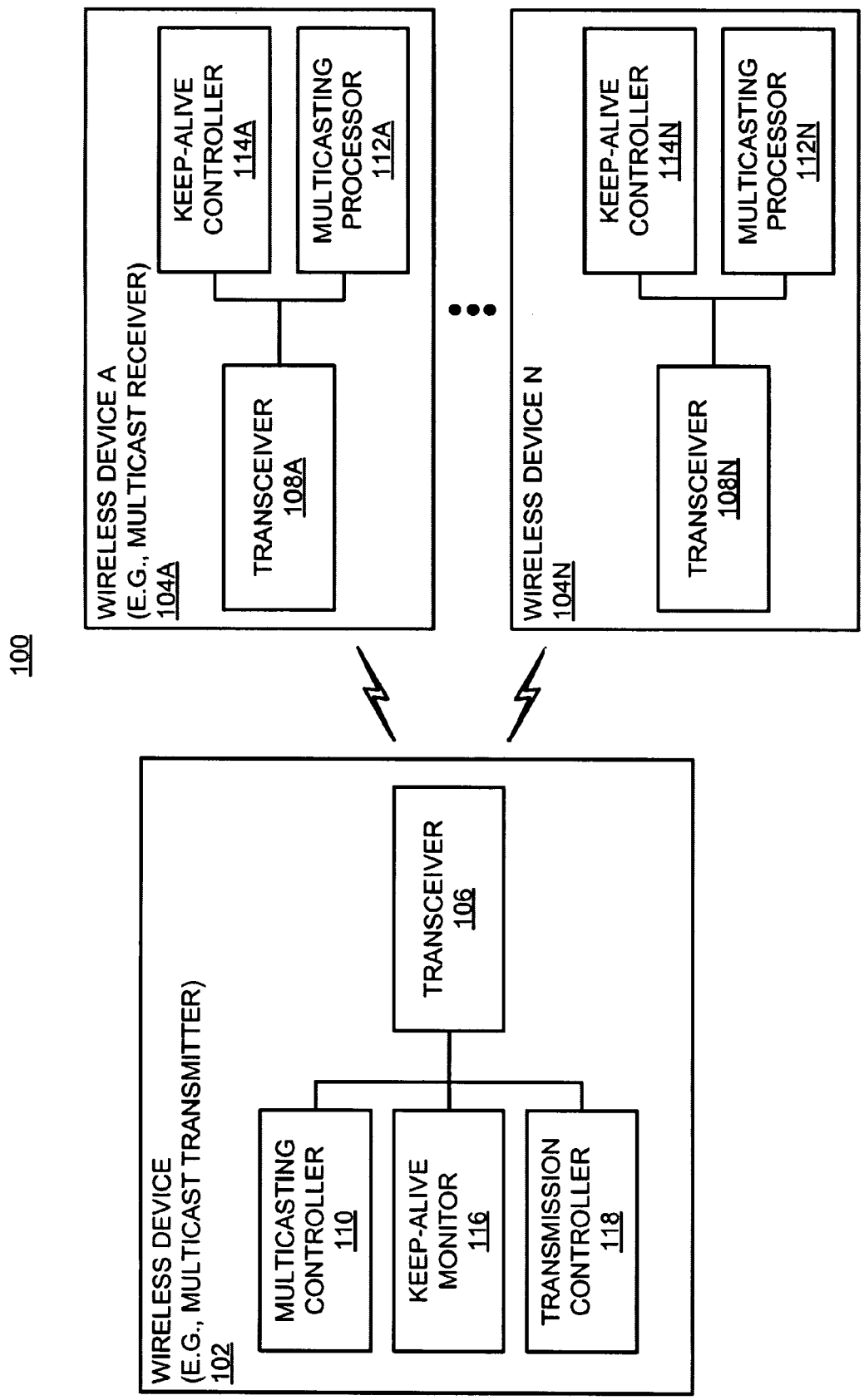
FIG. 1 is a simplified block diagram of several sample aspects of a wireless communication system employing keep-alives.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of the above, in some aspects packets are transmitted in accordance with a packet rate and keep-alive messages are received at a rate that is less than the packet rate, wherein a determination is made regarding whether to continue transmitting packets based on the received keep-alive messages. In addition, in some aspects a single device transmits the keep-alive messages while in other aspects several devices transmit the keep-alive messages.

FIG. 1 illustrates sample aspects of a wireless communication system 100 where a wireless device 102 communicates with one or more other wireless devices (e.g., as represented by wireless devices 104A-104N). The system 100 may take various forms. For example, in some implementations the system 100 may comprise a peer-to-peer wireless local area network.

For purposes of illustration, the discussion that follows describes a scenario where the device 102 transmits a data stream via a multicast channel. Here, the multicast streaming may be one-way to reduce the complexity and power consumption of these devices. For example, in this case the device 102 may only transmit the multicast stream while the devices 104A-104N may only receive the multicast stream. It should be appreciated, however, that the teachings herein may be applicable to other types of communication (e.g., unicast, broadcast, and so on) and other types of data transmissions (e.g., non-streaming transmissions).

In some implementations, the device 102 may control whether each of the devices 104A-104N is allowed or enabled to join a multicast session to receive the multicast stream. For example, the wireless device 102 may verify that a user of the device 104A possesses a proper passcode and/or has paid a requisite fee for accessing the data.

In contrast, any of the devices 104A-104N may stop listening to the multicast stream at any time. As an example, a user may simply turn off the device 104A without formally leaving the multicast session. In addition, a user may move the device 104A out of the communication range of the device 102, or vice versa.

In some aspect, it may be desirable to allow the device 102 to terminate the multicast session in the event none of the devices 104A-104N are listening to the multicast stream. For example, by terminating the multicast session, the device 102 may save power and free-up bandwidth on the channel that was used to transmit the multicast session. However, to reduce the complexity of the device 102, it also is desirable to avoid having the device 102 continually monitor each of the devices 104A-104N to determine whether they are listening to the multicast stream.

Accordingly, in some aspects one or more of the devices 104A-104N may transmit keep-alives to inform the device 102 that at least one of the devices 104A-104N is still listening to the multicast stream. In this case, the device 102 may simply monitor the received keep-alives to determine whether to maintain or terminate the multicast session.

A keep-alive may take various forms. For example, in some aspects a keep-alive may simply indicate the existence of a device. In some aspects a keep-alive may simply provide an indication that the device is expected to continue to listen to the multicast stream (e.g., listen for packets). Thus, in some implementations a keep-alive may not provide any indication as to whether any of the devices 104A-104N has successfully received data from the device 102. In contrast, in other implementations a keep-alive message may indicate that a device has received data and is expected to continue to receive data (e.g., packets). In some implementations a keep-alive may consist of a message. In some implementations a keep-alive comprises an indication that is provided in a message. For convenience, the discussion that follows may refer to a "keep-alive message." It should be appreciated that this term is intended to encompass any suitable technique for providing a keep-alive.

A keep-alive may be transmitted in various ways. For example, the device 104A may transmit a keep-alive message to the device 102 via a reverse link of a multicast channel or via some other channel.

In some aspects a given device will transmit its keep-alive messages at a relatively low frequency, as compared to the rate at which the streaming data is transmitted (e.g., the rate at which streaming packets are transmitted). Moreover, the keep-alive messages may not be directly solicited by a device that receives keep-alive messages. Rather, the devices 104A-104N may be configured to automatically transmit the keep-alive messages or may only be instructed a single time to transmit the keep-alive messages. In this way, a device implementing a keep-alive scheme may be less complex, consume less power, and utilize less bandwidth as compared to, for example, schemes where a receiving device acknowledges each message (e.g., packet) that it receives from a transmitting device.

An overview of the illustrated components of the system 100 follows. The device 102 includes a transceiver 106 that communicates with respective transceivers 108A-108N of the devices 104A-104N via a suitable wireless medium. The device 102 also includes a multicasting controller 110 that cooperates with multicasting processors 112A-112N of the devices 104A-104N, respectively, to enable the devices 104A-104N to receive a multicast stream provided by the device 102. At least one of the devices 104A-104N may repeatedly transmit a keep-alive message to inform the device 102 that a device is listening to the multicast stream. To this end, the devices 104A-104N include keep-alive controllers 114A-114N, respectively. The device 102 includes a keep-alive monitor 116 that monitors for the keep-alive messages. In the event the keep-alive monitor 116 determines that keep-alive messages are still being received from a least one of the devices 104A-104N, a transmission controller 118 of the device 102 may enable the continued transmission of the multicast stream. In contrast, if the monitor 116 is not receiving keep-alive messages, the transmission controller 118 may terminate the multicast stream.

Figure 2:
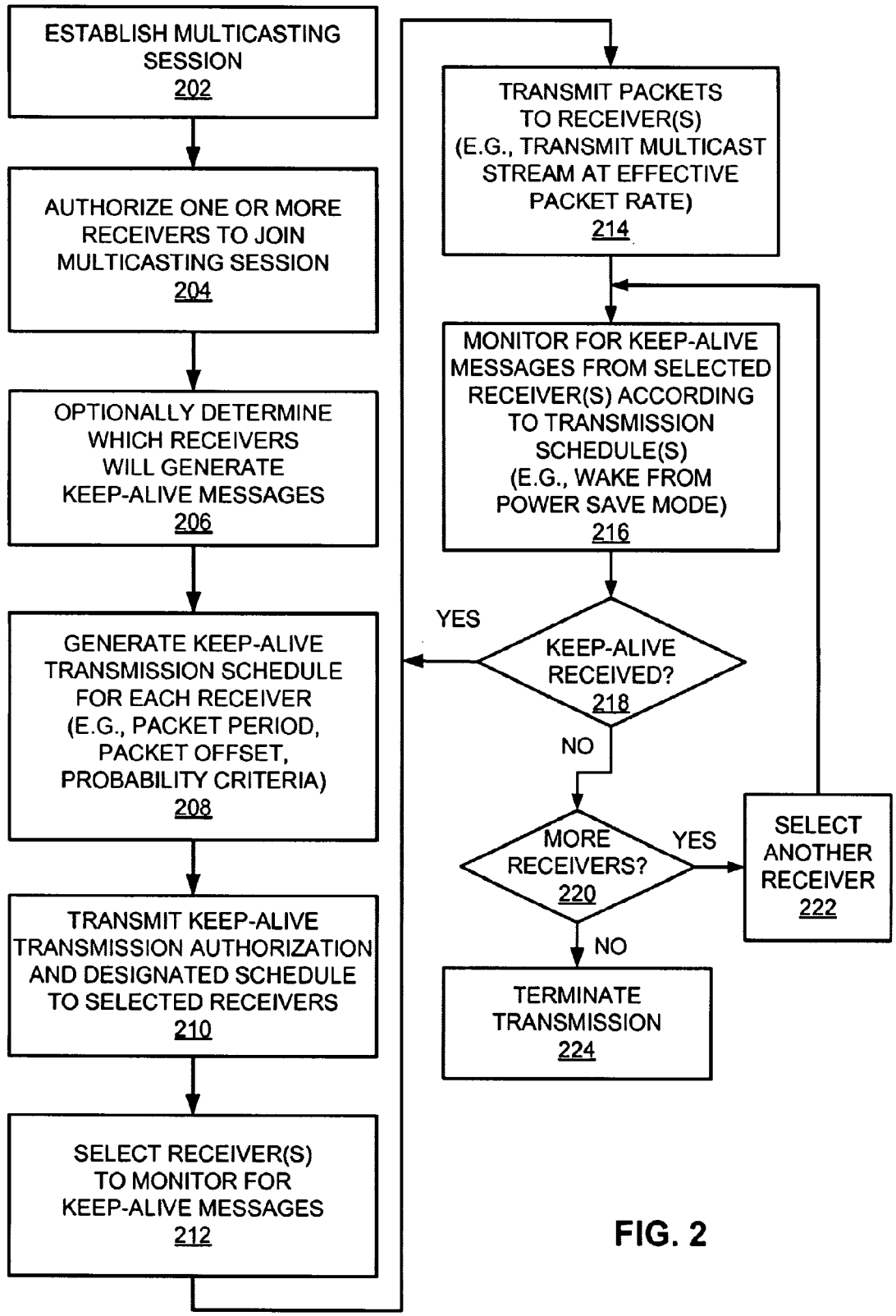
FIG. 2 is a flowchart of several sample aspects of operations that may be performed by a device that determines whether to continue transmitting based on whether it receives keep-alives.
Figure 3:
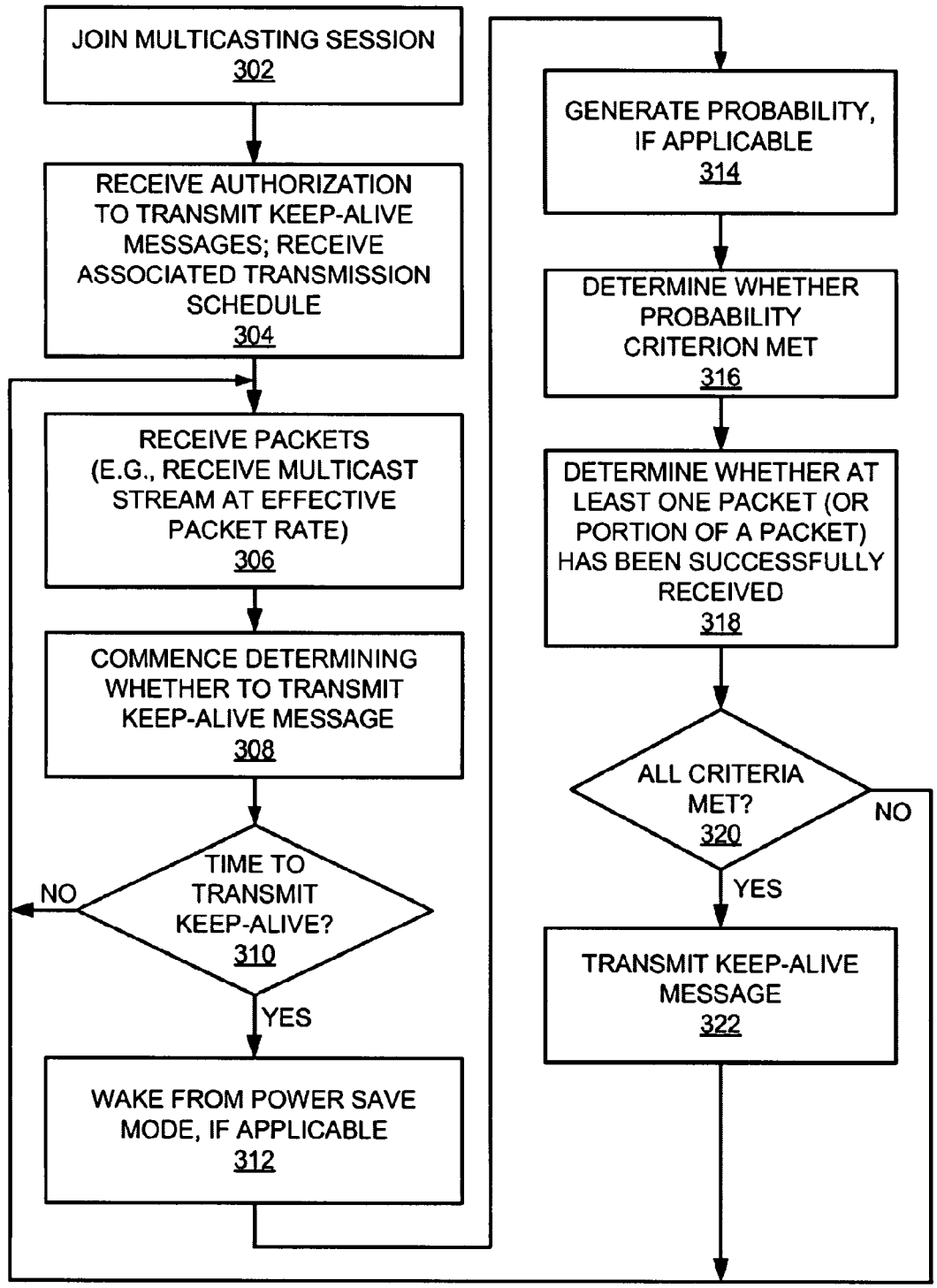
FIG. 3 is a flowchart of several sample aspects of operations that may be performed by a device that may transmit keep-alives to indicate that it expects to continue to listen for transmissions.
Figure 4:
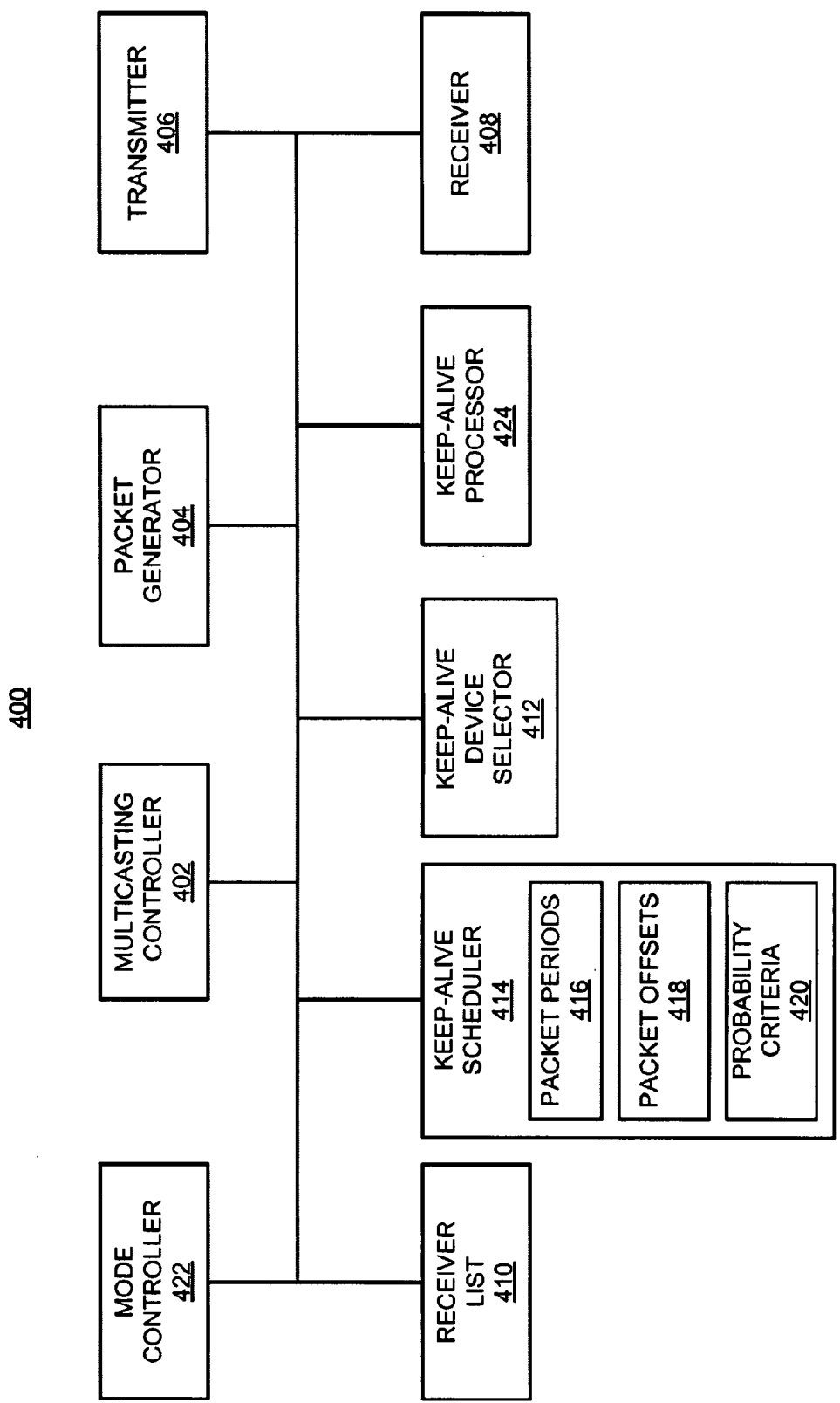
FIG. 4 is a simplified block diagram of several sample aspects of a device that is configured to transmit data to one or more other devices and is configured to receive keep-alives.
Figure 5:
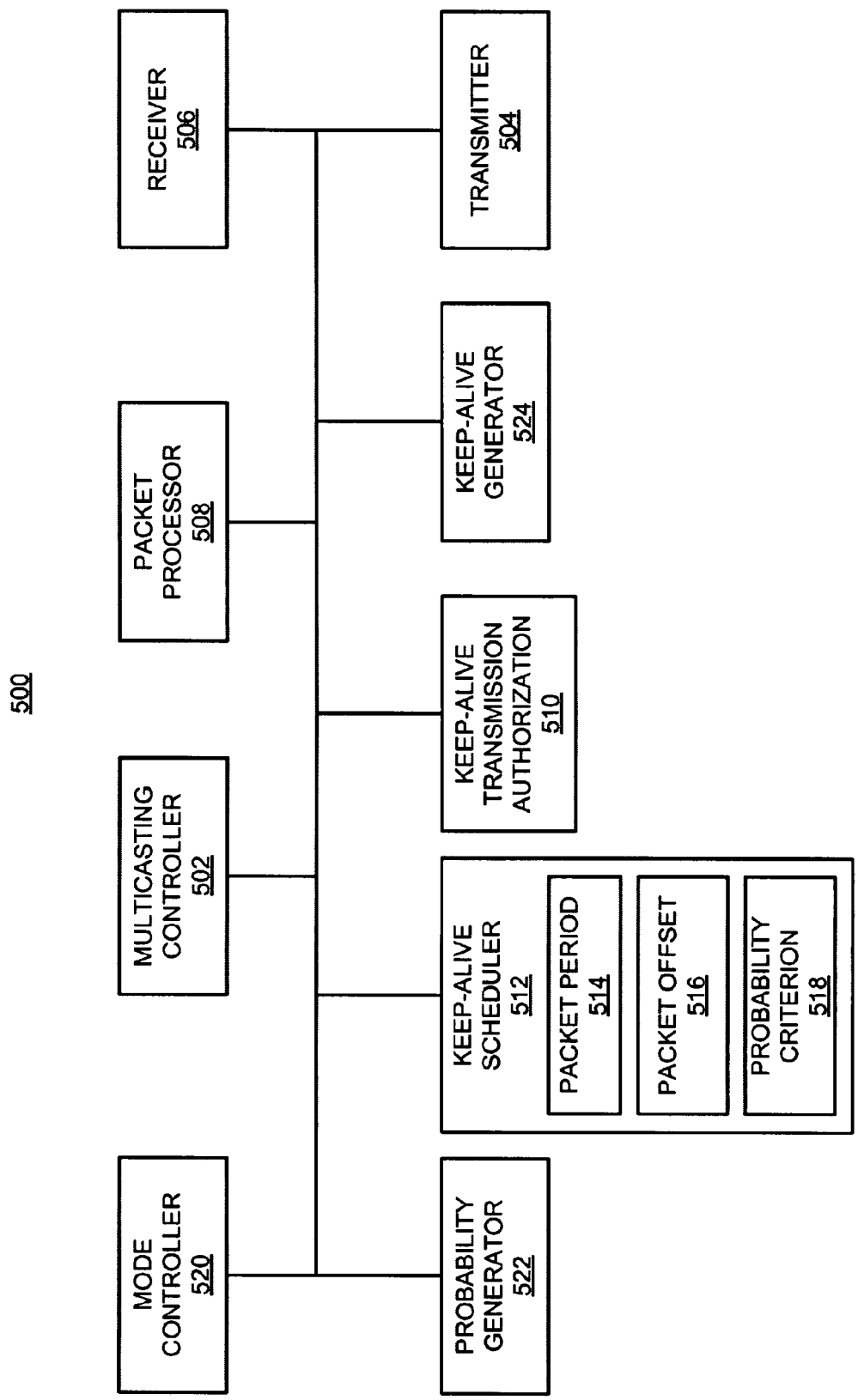
FIG. 5 is a simplified block diagram of several sample aspects of a device that is configured to transmit keep-alives.

With the above in mind, additional details relating to sample components and operations of the system 100 will be treated in conjunction with FIGS. 2-5. Briefly, FIG. 2 relates to sample operations that may be performed in conjunction with providing a multicast stream in accordance with the teachings herein. FIG. 3 relates to sample operations that may be performed in conjunction with receiving a multicast stream in accordance with the teachings herein. FIG. 4 illustrates several sample functional components of a device 400 (e.g., similar to the device 102) that provides a multicast stream in accordance with the teachings herein. FIG. 5 illustrates several sample functional components of a device 500 (e.g., similar to the device 104A) that receives a multicast stream in accordance with the teachings herein.

For convenience, the operations of FIGS. 2 and 3 (or any other operations discussed or taught herein) may be described as being performed by specific components (e.g., components of the device 400 or the device 500). It should be appreciated, however, that these operations may be performed by other types of components and may be performed using a different number of components. It also should be appreciated that one or more of the operations described herein may not be employed in a given implementation.

Referring initially to block 202 of FIG. 2, at some point in time a multicasting controller 402 of the device 400 (FIG. 4) establishes a multicast session. For example, the multicasting controller 402 may designate a specific IP address for a multicast group. The device 400 may then be designated as the sole transmitter for the multicast group. A packet generator 404 of the device 400 may then transmit data via a transmitter 406 to any other devices that join the multicast group.

In some use cases, the device 400 may comprise a wireless entertainment device (e.g., a music player). In these cases, the device 400 may transmit a multicast data stream to one or more listening devices in the immediate vicinity. As an example, the listening devices may comprise wireless headsets used by different users. It should be appreciated that the above is but one example of a form of communication that may be supported by the device 400 and that the teachings herein may be implemented in conjunction with other forms of communication.

Referring to FIG. 3, at some point in time the device 500 (FIG. 5) may elect to join the multicast session provided by the device 400. Thus, as represented by block 302, a multicasting controller 502 may cooperate with a transmitter 504 to send a request to the device 400 to join the multicast session. A receiver 408 of the device 400 then receives this request and forwards it to the multicasting controller 402.

In some implementations the device 400 performs security operations relating to controlling whether a device may be admitted to a multicast session. For example, at block 204 of FIG. 2 the multicasting controller 402 may control whether a device that is capable of receiving the multicast session data is authorized to join the multicast session. In the event the multicasting controller 402 authorizes the device 500 to join the multicast session, at block 204 the device 400 transmits an appropriate authorization message to the device 500 which is received by the device 500 in conjunction with block 302 of FIG. 3. Here, the addition of a new device to a multicast session may be seamless to any other devices that are part of the multicast group.

For convenience, a device (e.g., device 500) that is capable of receiving the multicast session data may be referred to herein as a "receiver." It should be appreciated that such device may also be capable of transmitting and receiving other data and control information.

The authorization scheme of block 204 may take various forms. For example, an authorization scheme may involve verifying that the user of a receiver is an authorized user (e.g., the user knows a secret passcode). Also, an authorization scheme may involve verifying that the user of the receiver has paid any subscription fee that may be required to receive the data stream being a multicast. In the event a given receiver is authorized to join the multicast session, the multicasting controller 402 may send appropriate information to the receiver to enable the receiver to receive the data stream. As an example, this information may comprise channel parameters that a receiver 506 of the device 500 may use to receive data via a channel over which the device 400 transmits the multicast session. In addition, the information may comprise one or more cryptographic keys that a packet processor 508 of the device 500 may use to decode the multicast session data.

Referring again to FIG. 4, in some implementations the device 400 may maintain a list 410 that identifies each receiver that has been authorized to receive the multicast stream. As will be discussed in more detail in conjunction with blocks 206-212, a subset (i.e., a portion or all) of these receivers may generate keep-alive messages as taught herein.

As represented by block 206, a keep-alive device selector 412 may designate one or more of the receivers for transmitting keep-alive messages. For example, the selector 412 may designate a single receiver (e.g., the first receiver to join the multicast group) for transmitting keep-alive messages. In this way, overlapping transmissions of keep-alive messages from different receivers will be avoided. In addition, designation of a single receiver in this way may reduce the collective overhead associated with the transmission of the keep-alive messages by the receivers. In addition, as will be discussed below, such a scheme may reduce the keep-alive overhead for the device 400 since the device 400 may only monitor keep-alive messages from a single receiver.

In other cases more than one receiver may generate keep-alive messages. For example, in some implementations the device 400 may designate two or more receivers for transmitting keep-alive messages. In other embodiments each receiver may be automatically configured to generate keep-alive messages whenever it joins a multicast session.

As represented by block 208, a keep-alive scheduler 414 of the device 400 may generate a keep-alive transmission schedule for each receiver that will generate keep-alive messages. As discussed herein, in some aspects a keep-alive transmission schedule may be defined such that a receiver transmits keep-alive messages at a rate that is less than an effective packet rate associated with the transmitted multicast data.

The use of such a keep-alive transmission schedule may provide various advantages. For example, through the use of a keep-alive transmission schedule, the device 400 may only need to monitor for keep-alive messages at the designated times. As a result, the device 400 may consume less power since the receiver 408 and other components of the device 400 may be active less often in contrast with, for example, a scheme where a device continually monitors for keep-alive messages.

Moreover, in the event multiple receivers are transmitting keep-alive messages, the keep-alive scheduler 414 may define the schedules to prevent overlapping transmissions of keep-alive messages. For example, the keep-alive schedule may specify that one receiver transmits its keep-alive messages at certain times while other receivers transmit their keep-alive messages at different times, whereby the keep-alive transmission times of the respective receivers are orthogonal.

A keep-alive schedule may take a variety of forms. For example, a schedule may relate to a keep-alive transmission rate, designated times, a count, or some other suitable criterion.

In some aspects a keep-alive schedule may specify a packet period 416 for keep-alive transmissions. For example, a schedule may designate that a given receiver transmits a keep-alive message once every 20 packets of a multicast packet stream. Thus, a schedule may cause one of the receivers to transmit a keep-alive message after the $1^{st}$ packet, after the $21^{st}$ packet, and so on.

In some aspects a keep-alive schedule may specify a packet offset 418. For example, a schedule may designate that the packet period 416 for a given receiver commences at a certain packet sequence number. Thus, in an example where the packet offset 418 is 5 and the packet period 416 is 10, a schedule may designate that one of the receivers transmits the keep-alive after the $6^{th}$ packet, after the $16^{th}$ packet, after the $26^{th}$ packet, and so on.

In some aspects as the number of receivers in a multicast group increases, the scheduler 414 may increase the packet period 416 defined for each receiver. As an example, if a packet period 416 of 10 was previously defined for each receiver, once the number of receivers exceeds 10, the scheduler 414 may increase the packet period 416 for each receiver to 20.

In some aspects a keep-alive schedule may be associated with a transmission probability criterion 420 (e.g., a probability threshold value). For example, as will be discussed in more detail below, when a given receiver is scheduled to transmit a keep-alive message, the receiver may either elect to transmit the keep-alive message or elect to not transmit the keep-alive message based on a probability criterion 420.

Block 210 of FIG. 2 and block 304 of FIG. 3 relate to a scenario where a given receiver (e.g., the device 500) is authorized to join the multicast session and will be or may be transmitting keep-alive messages. Here, the device 400 may transmit a message relating to a keep-alive transmission authorization to the device 500 based on the operations of block 206. The device 500 may then maintain an indication 510 relating to this authorization to enable the device 500 to determine whether it is to transmit a keep-alive message. In addition, the device 400 may transmit a keep-alive transmission schedule to the device 500 based on the operations of block 208. Thus, the device 500 may maintain its designated keep-alive schedule 512 including, for example, a designated packet period 514, a designated packet offset 516, a designated probability criterion 518, and any other suitable scheduling information.

At block 212 of FIG. 2, the keep-alive device selector 412 may elect to monitor for keep-alive messages from one or more designated receivers. For example, if only a single receiver is designated for transmitting keep-alive messages the device 400 may only monitor for keep-alive messages from that receiver according to the designated keep-alive transmission schedule. In other cases, in the event multiple receivers are transmitting keep-alive messages, the device 400 may monitor for keep-alive messages from a subset (e.g., one) of those receivers.

Block 214 of FIG. 2 and block 306 of FIG. 3 relate to the transmission of the multicast session data. In some implementations these operations may involve the packet generator 404 generating a series of packets whereby the transmitter 406 transmits these packets to the device 500. Upon receipt of these packets by the receiver 506, the packet processor 508 of the device 500 processes these packets as necessary and provides the associated data to the appropriate application or applications (e.g., an audio player).

In some aspects, these packets may be transmitted at an effective overall packet rate. For example, a packet rate may correspond to a quantity of packets that are transmitted over a certain period of time. Depending upon the requirements of a given application, this packet rate may be relatively constant or may vary. For example, in some cases packets may be transmitted at substantially regular intervals of time (e.g., for streaming data).

As mentioned above, in some implementations the multicast session data may comprise a multicast stream. Such a stream may comprise, for example, streaming multimedia data including one or more of audio, video, sensor data, or some other type of data. Streaming data may be transmitted in various ways. For example, in some implementations streaming data may comprise packet data that is transmitted in a relatively continuous manner. Here, continuous transmissions may be periodic transmissions or transmissions that are more irregular in nature. As an example of the latter type of transmission, at a macro level the data transmissions may be relatively continuous, while at a micro level the transmissions may be relatively bursty in nature.

The remaining blocks of FIGS. 2 and 3 relate, for the most part, to the generation and processing of keep-alive messages. In particular, blocks 308-322 of FIG. 3 relate to the generation and transmission of keep-alive messages by the device 500. Conversely, blocks 216-222 relate to the reception and processing of keep-alive messages by the device 400.

Referring initially to the keep-alive operations of FIG. 3, at block 308 the device 500 commences the process of determining whether to transmit a keep-alive message. In some aspects, the operation of block 310 may then involve determining whether the keep-alive schedule designated for the device 500 indicates that the device 500 is to transmit a keep-alive message at this time. In the event the device 500 is not scheduled to transmit a keep-alive message, the device 500 may simply continue to receive packets (i.e., at block 306) until the designated time for transmitting keep-alive message arrives.

As represented by block 312, in some aspects transmission of the keep-alive may relate to waking from a power save state (e.g., power save mode). For example, when the device 500 is not actively transmitting or receiving, a mode controller 520 may set one or more of the components of the device 500 (e.g., transceiver components) to a power save state. In this case, at the times designated by the keep-alive schedule (e.g., as indicated by an interrupt or some other suitable mechanism), the mode controller 520 may switch the mode of the device 500 from a power save state to an active state (e.g., active mode). Here, the active state may enable performance of the keep-alive operations including, for example, message transmission operations.

In the event the device 500 is scheduled to transmit a keep-alive message, at block 314 the device 500 may optionally utilize the probability criterion 518 determine whether to transmit the keep-alive message. Here, a probability generator 522 may generate a probability indication that a keep-alive generator 524 may consider to determine whether to transmit a keep-alive message at this time. For example, at block 316 the keep-alive generator 524 may compare the probability indication generated at block 314 with the probability criterion 518. As a specific example, the probability criterion 518 may specify that the device 500 is to transmit a keep-alive message if the probability indication generated by the probability generator exceeds 0.5. Thus, in cases where the probability indication is 0.5 or less, the device 500 will not transmit a keep-alive message even though it is currently scheduled to do so at this time. The use of this probability scheme may reduce the likelihood of overlapping transmissions of keep-alive message from multiple receivers when these receivers are scheduled to transmit keep-alive messages at the same time.

As represented by block 318, the device 500 may optionally determine whether to transmit the keep-alive message based on whether the device 500 has successfully received a verifiable portion of a packet from the device 400 within, for example, a window of a designated number of packets. Here, a verifiable portion of a packet may comprise, for example, at least a portion of one or more packets, at least a portion of a header of a packet, or at least a portion of a preamble of a packet.

As represented by block 320 in the event all of the designated keep-alive transmission criteria are met, the keep-alive generator 524 generates a keep-alive message and the transmitter 504 transmits the keep-alive message to the device 400. The device 500 may then continue to receive packets and transmit keep-alive messages, if applicable, until the multicast session ends or until the device 500 stops listening to the multicast stream. Here, it should be appreciated that once the device 500 stops listening to the multicast stream, the device 500 may stop transmitting keep-alive messages even though the device 500 was designated to transmit the keep-alive messages.

In some implementations it may be desirable to minimize the number of messages sent from the receivers to the device 400 (e.g., reverse link messages). In such cases, the device 500 may not inform the device 400 whether it is listening to the multicast stream or whether it will continue transmitting the keep-alive messages. As a result, the device 400 may not be informed when the last receiver of a multicast group has left the group. However, to reduce the complexity of the device 400, it also may be desirable to not require that the device 400 tracks the existence and operation of all of the receivers in a multicast group. Consequently, in accordance with the teachings herein a decision by the device 400 to stop streaming and tear down the associated channel may simply be based on a determination that the device 400 is no longer receiving keep-alive messages from any receiver.

Referring now to the keep-alive operations of FIG. 2, as represented by block 216, in conjunction with the transmission of the data for the multicast session, the device 400 will monitor for keep-alive messages from at least one receiver (e.g., as designated at block 212). In some aspects reception of a keep-alive message also may relate to waking from a power save state (e.g., power save mode). For example, when the device 400 is not actively transmitting or receiving, a mode controller 422 may set one or more of the components of the device 400 (e.g., transceiver components) to a power save state. In this case, at the times designated by the keep-alive schedule (e.g., as indicated by an interrupt or some other suitable mechanism), the mode controller 422 may switch the mode of the device 400 from a power save state to an active state (e.g., active mode). The active state may thus enable performance of the keep-alive operations including, for example, message reception operations.

In the event the device 400 is scheduled to receive a keep-alive message, at block 218 a keep-alive processor 424 may determine whether a scheduled keep-alive message has been received as expected. If a scheduled keep-alive message is received, the device 400 may continue transmitting the multicast data (block 214) and monitoring for keep-alive messages (block 216) until the multicast session terminates.

In the event a scheduled keep-alive message has not been received at block 218 (e.g., a message has not been received for a designated period of time), the keep-alive processor 424 may determine that the corresponding receiver is no longer listening to the multicast stream. In this case, the keep-alive processor may remove the receiver from the receiver list 410. In addition, the keep-alive transmission schedule designated for that receiver may be made available for reassignment to a different receiver (e.g., a receiver the subsequently joins the multicast group).

As represented by block 220, the device 400 may then determine whether there are any more receivers listening to the multicast stream. This may involve, for example, determining whether there are any receivers left on the receiver list 410 and transmitting an appropriate control message to one or more of these receivers to identify at least one receiver that is still listening to the multicast stream.

As represented by block 222, in the event there are additional receivers that may be listening to the multicast stream, the keep-alive device selector 412 may select one or more of these receivers for subsequent keep-alive-related operations. For example, in some implementations this may involve sending a message to a receiver to inform the receiver that it is now authorized to transmit keep-alive messages. In conjunction with this authorization the device 400 may send a keep-alive transmission schedule to the selected receiver(s).

In addition or in the alternative, at block 222 the device 400 may elect to monitor for keep-alive messages from the selected receiver. As an example, in the event the device 400 designated a new receiver for transmitting keep-alive messages, the device 400 may elect to monitor for keep-alive messages from that receiver. Conversely, in the event multiple receivers were previously designated or configured to transmit keep-alive messages, the device 400 may now elect to monitor for keep-alive messages from one or more of those receivers, rather than the previously designated receiver. As an example, the device 400 may simply elect to use an offset 418 (previously defined for a different receiver) during subsequent monitoring operations. As represented by the line returning to blocks 216 and 218 in FIG. 2, the device 400 may thus commence monitoring for keep-alive messages from the newly designated receiver(s).

In the event the device 400 determines at block 220 that there are no longer any receivers listening to the multicast stream, the multicasting controller 402 may terminate the multicast session (block 224). In this way, the battery life of the device 400 may be extended since it will no longer be wasting power transmitting a multicast session when there are no multicast receivers listening. Moreover, by terminating the transmission, the device 400 will free up resources of the associated communication medium. Hence, this keep-alive scheme may more efficiently make use of the bandwidth that may be used by the device 400.

It should be appreciated from the above that a channel may be switched seamlessly between unicast and multicast modes. For example, when a transmitting device 400 is transmitting a multicast stream to a single receiving device 500, the devices are effectively operating in a unicast mode. When another receiving device 500 associates with the transmitting device 400 to join the multicast session, the devices may then seamlessly switch to multicast mode. Then, when all but one of the receiving devices has stopped listening to the multicast stream, the transmitting device and the receiving device may thereby seamlessly switch to a unicast mode.

Figure 6:
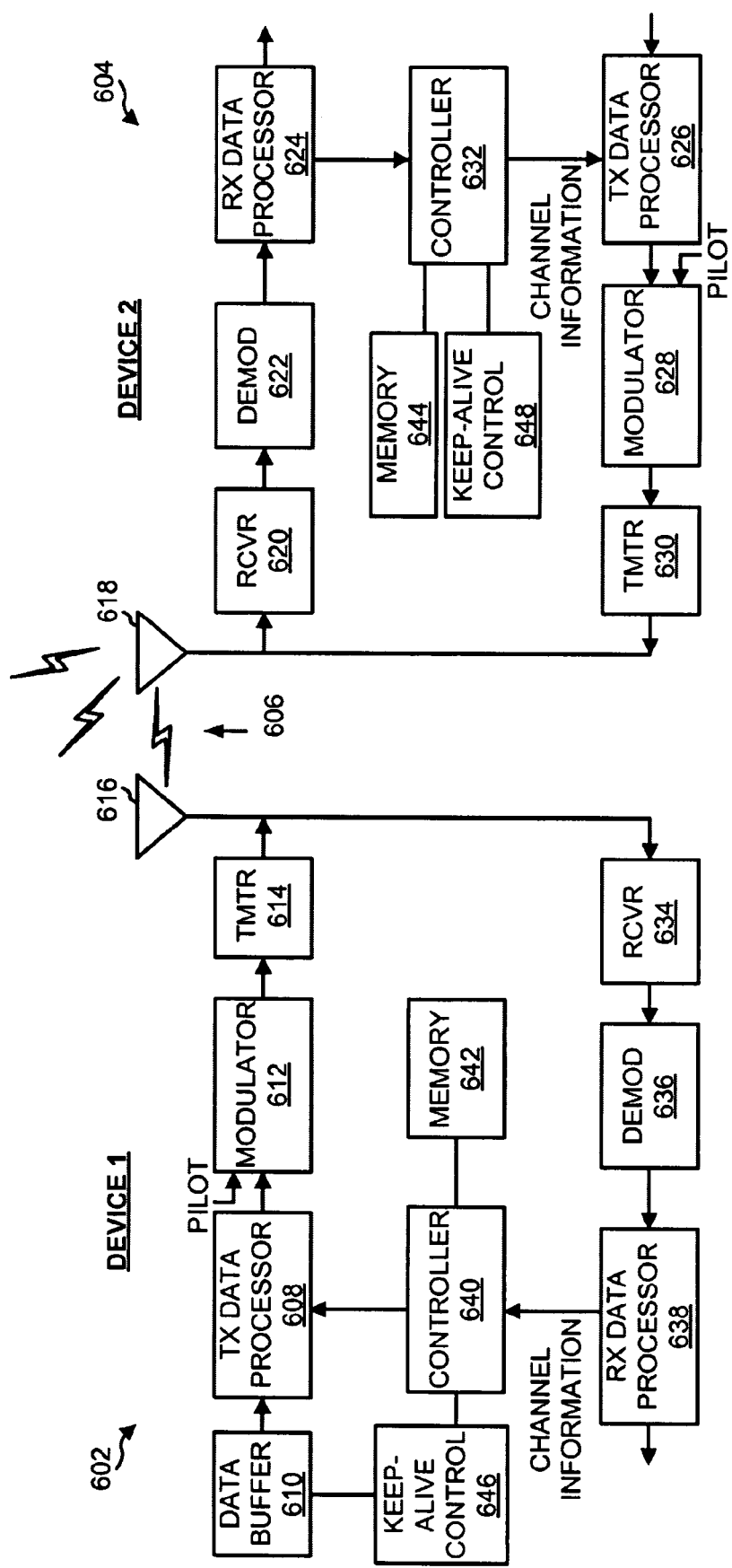
FIG. 6 is a simplified block diagram of several sample aspects of communication components.

The teachings herein may be incorporated into a device employing various components for communicating with at least one other device. FIG. 6 depicts several sample components that may be employed to facilitate communication between devices. Here, a first device 602 and a second device 604 are adapted to communicate via a wireless communication link 606 over a suitable medium.

Initially, components involved in sending information from the device 602 to the device 604 (e.g., a reverse link) will be treated. A transmit ("TX") data processor 608 receives traffic data (e.g., data packets) from a data buffer 610 or some other suitable component. The transmit data processor 608 processes (e.g., encodes, interleaves, and symbol maps) each data packet based on a selected coding and modulation scheme, and provides data symbols. In general, a data symbol is a modulation symbol for data, and a pilot symbol is a modulation symbol for a pilot (which is known a priori). A modulator 612 receives the data symbols, pilot symbols, and possibly signaling for the reverse link, and performs modulation (e.g., OFDM or some other suitable modulation) and/or other processing as specified by the system, and provides a stream of output chips. A transmitter ("TMTR") 614 processes (e.g., converts to analog, filters, amplifies, and frequency upconverts) the output chip stream and generates a modulated signal, which is then transmitted from an antenna 616.

The modulated signals transmitted by the device 602 (along with signals from other devices in communication with the device 604) are received by an antenna 618 of the device 604. A receiver ("RCVR") 620 processes (e.g., conditions and digitizes) the received signal from the antenna 618 and provides received samples. A demodulator ("DEMOD") 622 processes (e.g., demodulates and detects) the received samples and provides detected data symbols, which may be a noisy estimate of the data symbols transmitted to the device 604 by the other device(s). A receive ("RX") data processor 624 processes (e.g., symbol demaps, deinterleaves, and decodes) the detected data symbols and provides decoded data associated with each transmitting device (e.g., device 602).

Components involved in sending information from the device 604 to the device 602 (e.g., a forward link) will be now be treated. At the device 604, traffic data is processed by a transmit ("TX") data processor 626 to generate data symbols. A modulator 628 receives the data symbols, pilot symbols, and signaling for the forward link, performs modulation (e.g., OFDM or some other suitable modulation) and/or other pertinent processing, and provides an output chip stream, which is further conditioned by a transmitter ("TMTR") 630 and transmitted from the antenna 618. In some implementations signaling for the forward link may include power control commands and other information (e.g., relating to a communication channel) generated by a controller 632 for all devices (e.g. terminals) transmitting on the reverse link to the device 604.

At the device 602, the modulated signal transmitted by the device 604 is received by the antenna 616, conditioned and digitized by a receiver ("RCVR") 634, and processed by a demodulator ("DEMOD") 636 to obtain detected data symbols. A receive ("RX") data processor 638 processes the detected data symbols and provides decoded data for the device 602 and the forward link signaling. A controller 640 receives power control commands and other information to control data transmission and to control transmit power on the reverse link to the device 604.

The controllers 640 and 632 direct various operations of the device 602 and the device 604, respectively. For example, a controller may determine an appropriate filter, reporting information about the filter, and decode information using a filter. Data memories 642 and 644 may store program codes and data used by the controllers 640 and 632, respectively.

FIG. 6 also illustrates that the communication components may include one or more components that perform at least a portion of the keep-alive operations as taught herein. For example, a keep-alive control component 646 may cooperate with the controller 640 and/or other components of the device 602 to send/receive information to/from another device (e.g., device 604). Similarly, a keep-alive control component 648 may cooperate with the controller 632 and/or other components of the device 604 to send/receive information to/from another device (e.g., device 602).

A wireless device may include various components that perform functions based on data that is transmitted by or received at the wireless device. For example, a wireless headset may include a transducer adapted to provide an audio output based on data received via the receiver. A wireless watch may include a user interface adapted to provide an indication based on data received via the receiver. A wireless sensing device may include a sensor adapted to provide data to be transmitted via the transmitter.

A wireless device may communicate via one or more wireless communication links that are based on or otherwise support any suitable wireless communication technology. For example, in some aspects a wireless device may associate with a network. In some aspects the network may comprise a body area network or a personal area network (e.g., an ultra-wideband network). In some aspects the network may comprise a local area network or a wide area network. A wireless device may support or otherwise use one or more of a variety of wireless communication technologies, protocols, or standards such as, for example, CDMA, TDMA, OFDM, OFDMA, WiMAX, and Wi-Fi. Similarly, a wireless device may support or otherwise use one or more of a variety of corresponding modulation or multiplexing schemes. A wireless device may thus include appropriate components (e.g., air interfaces) to establish and communicate via one or more wireless communication links using the above or other wireless communication technologies. For example, a device may comprise a wireless transceiver with associated transmitter and receiver components (e.g., transmitters 406 and 504 and receivers 408 and 506) that may include various components (e.g., signal generators and signal processors) that facilitate communication over a wireless medium.

In some aspects a wireless device may communicate via an impulse-based wireless communication link. For example, an impulse-based wireless communication link may utilize ultra-wideband pulses that have a relatively short length (e.g., on the order of a few nanoseconds) and a relatively wide bandwidth. In some aspects the ultra-wideband pulses may have a fractional bandwidth on the order of approximately 20% or more and/or have a bandwidth on the order of approximately 500 MHz or more.

The teachings herein may be incorporated into (e.g., implemented within or performed by) a variety of apparatuses (e.g., devices). For example, one or more aspects taught herein may be incorporated into a phone (e.g., a cellular phone), a personal data assistant ("PDA"), an entertainment device (e.g., a music or video device), a headset (e.g., headphones, an earpiece, etc.), a microphone, a medical device (e.g., a biometric sensor, a heart rate monitor, a pedometer, an EKG device, etc.), a user I/O device (e.g., a watch, a remote control, a light switch, a keyboard, a mouse, etc.), a tire pressure monitor, a computer, a point-of-sale device, an entertainment device, a hearing aid, a set-top box, or any other suitable device.

These devices may have different power and data requirements. In some aspects, the teachings herein may be adapted for use in low power applications (e.g., through the use of an impulse-based signaling scheme and low duty cycle modes) and may support a variety of data rates including relatively high data rates (e.g., through the use of high-bandwidth pulses).

In some aspects a wireless device may comprise an access device (e.g., a Wi-Fi access point) for a communication system. Such an access device may provide, for example, connectivity to another network (e.g., a wide area network such as the Internet or a cellular network) via a wired or wireless communication link. Accordingly, the access device may enable another device (e.g., a Wi-Fi station) to access the other network or some other functionality. In addition, it should be appreciated that one or both of the devices may be portable or, in some cases, relatively non-portable.

Figure 7:
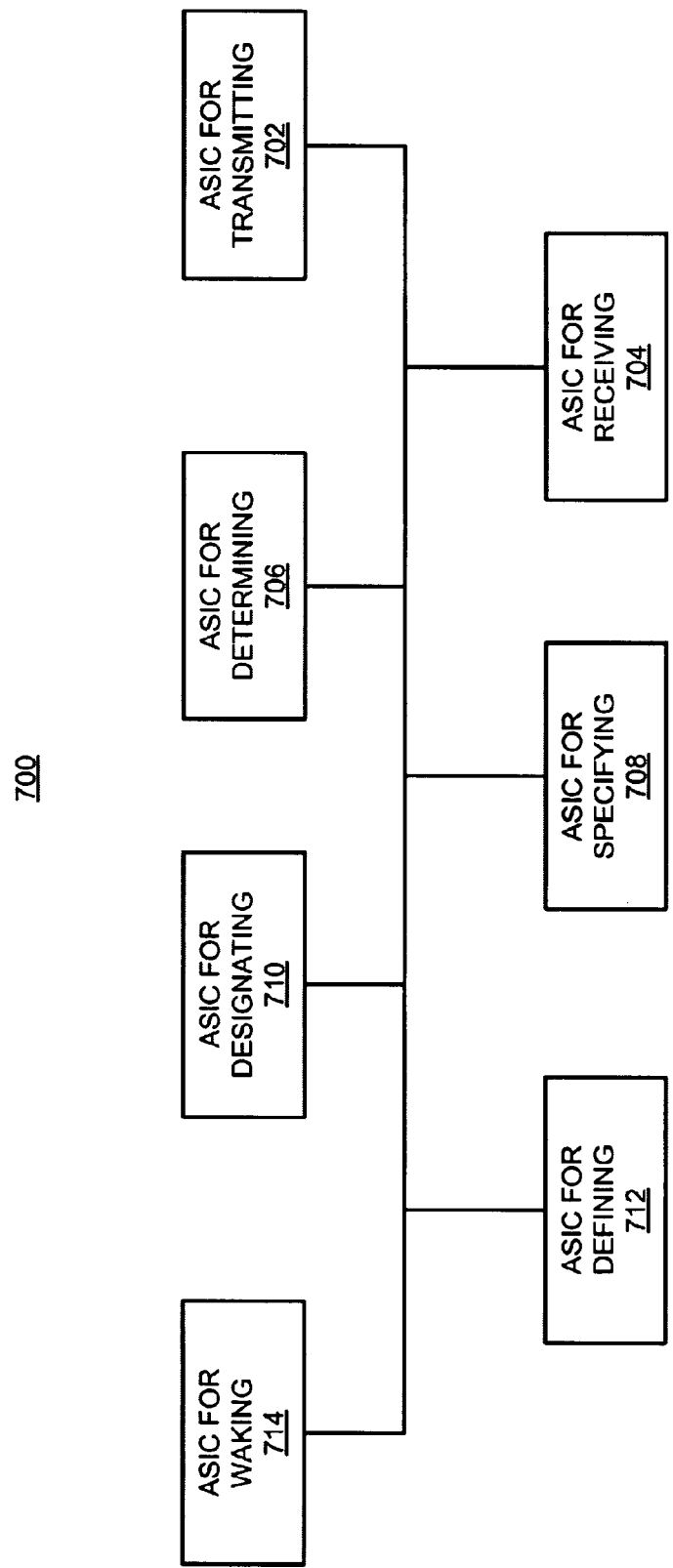
FIGS. 7 and 8 are simplified block diagrams of several sample aspects of apparatuses configured to support wireless communication through the use of keep-alives.
Figure 8:
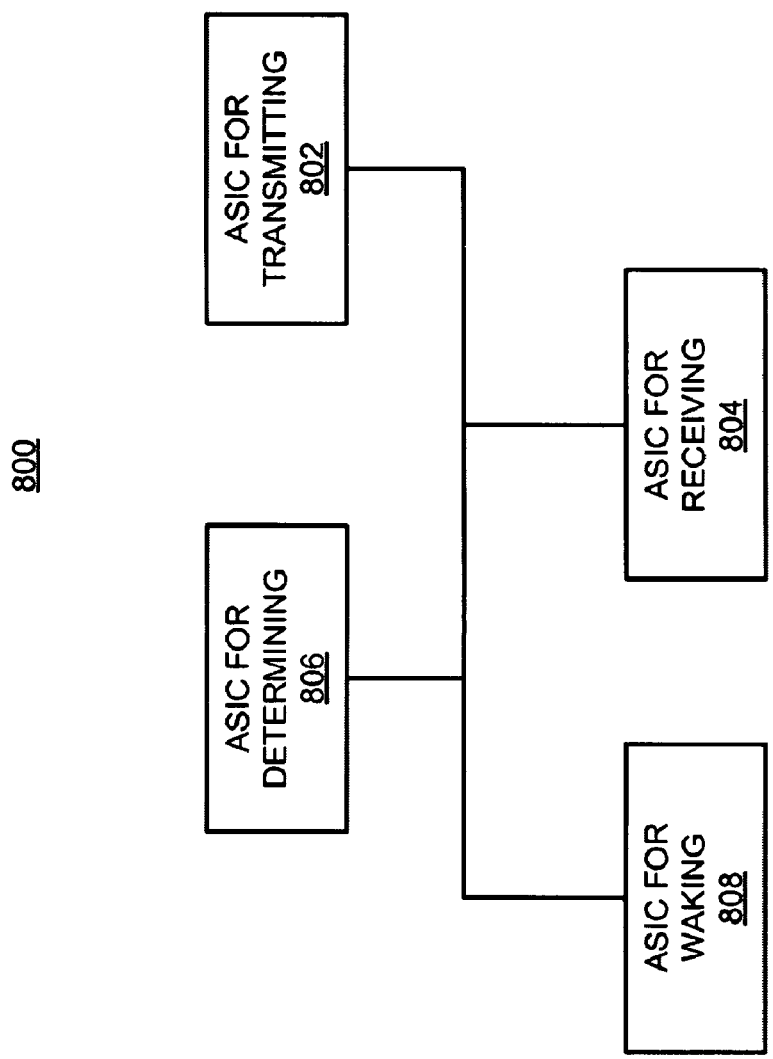

The components described herein may be implemented in a variety of ways. Referring to FIGS. 7 and 8, apparatuses 700 and 800 are represented as a series of interrelated functional blocks that may represent functions implemented by, for example, one or more integrated circuits (e.g., an ASIC) or may be implemented in some other manner as taught herein. As discussed herein, an integrated circuit may include a processor, software, other components, or some combination thereof.

The apparatuses 700 and 800 may include one or more modules that may perform one or more of the functions described above with regard to various figures. For example, an ASIC for transmitting 702 or 802 may correspond to, for example, a transmitter as discussed herein. An ASIC for receiving 704 or 804 may correspond to, for example, a receiver as discussed herein. An ASIC for determining 706 may correspond to, for example, a keep-alive processor as discussed herein. An ASIC for determining 806 may correspond to, for example, a keep-alive controller as discussed herein. An ASIC for waking 714 or 808 may correspond to, for example, a mode controller as discussed herein. An ASIC for specifying 708 may correspond to, for example, a keep-alive device selector as discussed herein. An ASIC for designating 710 may correspond to, for example, a keep-alive device selector as discussed herein. An ASIC for defining 712 may correspond to, for example, a keep-alive scheduler as discussed herein.

As noted above, in some aspects these components may be implemented via appropriate processor components. These processor components may in some aspects be implemented, at least in part, using structure as taught herein. In some aspects a processor may be adapted to implement a portion or all of the functionality of one or more of these components. In some aspects one or more of the components represented by dashed boxes are optional.

As noted above, the apparatuses 700 and 800 may comprise one or more integrated circuits. For example, in some aspects a single integrated circuit may implement the functionality of one or more of the illustrated components, while in other aspects more than one integrated circuit may implement the functionality of one or more of the illustrated components.

In addition, the components and functions represented by FIGS. 7 and 8 as well as other components and functions described herein, may be implemented using any suitable means. Such means also may be implemented, at least in part, using corresponding structure as taught herein. For example, the components described above in conjunction with the "ASIC for" components of FIGS. 7 and 8 also may correspond to similarly designated "means for" functionality. Thus, in some aspects one or more of such means may be implemented using one or more of processor components, integrated circuits, or other suitable structure as taught herein.

Also, it should be understood that any reference to an element herein using a designation such as "first," "second," and so forth does not generally limit the quantity or order of those elements. Rather, these designations may be used herein as a convenient method of distinguishing between two or more different elements. Thus, a reference to first and second elements does not mean that only two elements may be employed there or that the first element must precede the second element in some manner. Also, unless stated otherwise a set of elements may comprise one or more elements.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes (e.g., executable by at least one computer) relating to one or more of the aspects of the disclosure. In some aspects a computer program product may comprise packaging materials.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. A method of wireless communication, comprising:
    transmitting packets to a plurality of wireless devices, wherein the packets are transmitted in accordance with a packet rate;
    receiving keep-alive messages from a subset consisting of a portion of the plurality of wireless devices, wherein the keep-alive messages are received at a rate that is less than the packet rate; and
    determining, based on the received keep-alive messages from only the subset, whether to continue transmitting packets to the plurality of wireless devices.

2. The method of claim 1, wherein the packets are transmitted at substantially regular intervals of time.

3. The method of claim 1, wherein the packets comprise multicast packets.

4. The method of claim 1, wherein the packets comprise a portion of a data stream.

5. The method of claim 4, further comprising:
    determining that the plurality of wireless devices are no longer listening to the data stream;
    wherein the determination of whether to continue to transmit the packets comprises determining to terminate the data stream.

6. The method of claim 1, wherein the subset consists of only one of the wireless devices.

7. The method of claim 1, further comprising specifying which of the wireless devices is to transmit the keep-alive messages.

8. The method of claim 1, further comprising:
    determining that keep-alive messages are no longer being received from the subset;
    designating another subset of the wireless devices to transmit keep-alive messages; and
    receiving keep-alive messages from the another subset at a rate that is less than the packet rate.

9. The method of claim 1, further comprising defining a transmission schedule for each of the wireless devices to transmit the keep-alive messages.

10. The method of claim 9, wherein the transmission schedule designates that the wireless devices transmit the keep-alive messages at different times.

11. The method of claim 9, wherein the transmission schedule comprises a packet period and a packet offset for each of the wireless devices.

12. The method of claim 9, wherein the transmission schedule comprises at least one probability criterion for use by the wireless devices to determine whether to transmit the keep-alive messages.

13. The method of claim 1, further comprising waking from a power save state at designated times to receive the keep-alive messages.

14. The method of claim 1, wherein the keep-alive messages indicate that the subset is expected to continue to listen for packets.

15. The method of claim 1, wherein each of the keep-alive messages indicates that the subset has received and is expected to continue to receive packets.

16. An apparatus for wireless communication, comprising:
    a transmitter configured to transmit packets to a plurality of wireless devices, wherein the packets are transmitted in accordance with a packet rate;
    a receiver configured to receive keep-alive messages from a subset consisting of a portion of the plurality of wireless devices, wherein the keep-alive messages are received at a rate that is less than the packet rate; and
    a keep-alive processor configured to determine, based on the received keep-alive messages from only the subset, whether to continue transmitting packets to the plurality of wireless devices.

17. The apparatus of claim 16, wherein the packets are transmitted at substantially regular intervals of time.

18. The apparatus of claim 16, wherein the packets comprise multicast packets.

19. The apparatus of claim 16, wherein the packets comprise a portion of a data stream.

20. The apparatus of claim 19, wherein:
    the keep-alive processor is further configured to determine that the plurality of wireless devices are no longer listening to the data stream; and
    the determination of whether to continue to transmit the packets comprises determining to terminate the data stream.

21. The apparatus of claim 16, wherein the subset consists of only one of the wireless devices.

22. The apparatus of claim 16, further comprising a keep-alive device selector configured to specify which of the wireless devices is to transmit the keep-alive messages.

23. The apparatus of claim 16, wherein:
    the keep-alive processor is further configured to determine that keep-alive messages are no longer being received from the subset;
    the apparatus further comprises a keep-alive device selector configured to designate another subset of the wireless devices to transmit keep-alive messages; and
    the receiver is further configured to receive keep-alive messages from the another subset at a rate that is less than the packet rate.

24. The apparatus of claim 16, further comprising a keep-alive scheduler configured to define a transmission schedule for each of the wireless devices to transmit the keep-alive messages.

25. The apparatus of claim 24, wherein the transmission schedule designates that the wireless devices transmit the keep-alive messages at different times.

26. The apparatus of claim 24, wherein the transmission schedule comprises a packet period and a packet offset for each of the wireless devices.

27. The apparatus of claim 24, wherein the transmission schedule comprises at least one probability criterion for use by the wireless devices to determine whether to transmit the keep-alive messages.

28. The apparatus of claim 16, further comprising a mode controller configured to enable at least a portion of the apparatus to wake from a power save state at designated times to receive the keep-alive messages.

29. The apparatus of claim 16, wherein the keep-alive messages indicate that the subset is expected to continue to listen for packets.

30. The apparatus of claim 16, wherein each of the keep-alive messages indicates that the subset has received and is expected to continue to receive packets.

31. An apparatus for wireless communication, comprising:
means for transmitting packets to a plurality of wireless devices, wherein the packets are transmitted in accordance with a packet rate;
means for receiving keep-alive messages from a subset consisting of a portion of the plurality of wireless devices, wherein the keep-alive messages are received at a rate that is less than the packet rate; and
means for determining, based on the received keep-alive messages from only the subset, whether to continue transmitting packets to the plurality of wireless devices.

32. The apparatus of claim 31, wherein the packets are transmitted at substantially regular intervals of time.

33. The apparatus of claim 31, wherein the packets comprise multicast packets.

34. The apparatus of claim 31, wherein the packets comprise a portion of a data stream.

35. The apparatus of claim 34, wherein:
the means for determining further determines that the plurality of wireless devices are no longer listening to the data stream; and
the determination of whether to continue to transmit packets comprises determining to terminate the data stream.

36. The apparatus of claim 31, wherein the subset consists of only one of the wireless devices.

37. The apparatus of claim 31, further comprising means for specifying which of the wireless devices is to transmit the keep-alive messages.

38. The apparatus of claim 31, wherein:
the means for determining further determines that the subset of the keep-alive messages are no longer being received from the subset;
the apparatus further comprises means for designating another subset of the wireless devices to transmit keep-alive messages; and
the means for receiving further receives keep-alive messages from the another subset at a rate that is less than the packet rate.

39. The apparatus of claim 31, further comprising means for defining a transmission schedule for each of the wireless devices to transmit keep-alive messages.

40. The apparatus of claim 39, wherein the transmission schedule designates that the wireless devices transmit the keep-alive messages at different times.

41. The apparatus of claim 39, wherein the transmission schedule comprises a packet period and a packet offset for each of the wireless devices.

42. The apparatus of claim 39, wherein the transmission schedule comprises at least one probability criterion for use by the wireless devices to determine whether to transmit the keep-alive messages.

43. The apparatus of claim 31, further comprising means for waking from a power save state at designated times to receive the keep-alive messages.

44. The apparatus of claim 31, wherein the keep-alive messages indicate that the subset is expected to continue to listen for packets.

45. The apparatus of claim 31, wherein each of the keep-alive messages indicates that the subset has received and is expected to continue to receive packets.

46. A computer-program product for wireless communication, comprising:
computer-readable medium comprising codes executable by at least one computer to:
transmit packets to a plurality of wireless devices, wherein the packets are transmitted in accordance with a packet rate;
receive keep-alive messages from a subset consisting of a portion of the plurality of wireless devices, wherein the keep-alive messages are received at a rate that is less than the packet rate; and
determine, based on the received keep-alive messages from only the subset, whether to continue transmitting packets to the plurality of wireless devices.

47. A headset for wireless communication, comprising:
a transmitter configured to transmit packets to a plurality of wireless devices, wherein the packets are transmitted in accordance with a packet rate;
a receiver configured to receive keep-alive messages from a subset consisting of a portion of the plurality of wireless devices, wherein the keep-alive messages are received at a rate that is less than the packet rate;
a transmission controller configured to determine, based on the received keep-alive messages from only the subset, whether to continue transmitting packets to the plurality of wireless devices; and
a transducer adapted to provide an audio output based on data received via the receiver.

48. A watch for wireless communication, comprising:
a transmitter configured to transmit packets to a plurality of wireless devices, wherein the packets are transmitted in accordance with a packet rate;
a receiver configured to receive keep-alive messages from a subset consisting of a portion of the plurality of wireless devices, wherein the keep-alive messages are received at a rate that is less than the packet rate;
a transmission controller configured to determine, based on the received keep-alive messages from only the subset, whether to continue transmitting packets to the plurality of wireless devices; and
a user interface adapted to provide an indication based on data received via the receiver.

49. A sensing device for wireless communication, comprising:
a transmitter configured to transmit packets to a plurality of wireless devices, wherein the packets are transmitted in accordance with a packet rate;
a receiver configured to receive keep-alive messages from a subset consisting of a portion of the plurality of wireless devices, wherein the keep-alive messages are received at a rate that is less than the packet rate;
a transmission controller configured to determine, based on the received keep-alive messages from only the subset, whether to continue transmitting packets to the plurality of wireless devices; and
a sensor adapted to provide data to be transmitted via the transmitter.

50. A method of wireless communication, comprising:
receiving packets from a wireless device, wherein the packets are received in accordance with a packet rate;
determining whether to transmit keep-alive messages to the wireless device based on at least one criterion; and if the at least one criterion is satisfied, transmitting keep-alive messages to the wireless device at a rate that is less than the packet rate.

51. The method of claim 50, wherein the packets comprise multicast packets.

52. The method of claim 50, wherein the packets are received at substantially regular intervals of time.

53. The method of claim 50, wherein the packets comprise a portion of a data stream.

54. The method of claim 50, wherein the at least one criterion is based on receipt of a message from the wireless device authorizing transmission of the keep-alive messages.

55. The method of claim 50, further comprising receiving an indication from the wireless device that designates the rate for the transmission of the keep-alive messages.

56. The method of claim 50, wherein the keep-alive messages are transmitted based on a transmission schedule received from the wireless device.

57. The method of claim 56, wherein the transmission schedule comprises a packet period and a packet offset.

58. The method of claim 56, wherein the transmission schedule defines different keep-alive transmission times for different wireless devices that are configured to transmit keep-alive messages.

59. The method of claim 50, wherein the at least one criterion is based on a probability parameter.

60. The method of claim 59, wherein the determination of whether to transmit the keep-alive messages comprises determining to not transmit a given one of the keep-alive messages based on comparison of the probability parameter with a probability threshold.

61. The method of claim 50, wherein the keep-alive messages indicate an expectation to continue to listen for packets.

62. The method of claim 50, wherein each of the keep-alive messages indicates receipt of packets and an expectation to continue to receive packets.

63. The method of claim 50, wherein the at least one criterion is based on whether at least one packet has successfully been received within a defined period of time.

64. The method of claim 63, wherein the defined period of time comprises a window associated with a defined number of packets.

65. The method of claim 50, wherein the at least one criterion is based on whether a verifiable portion of at least one packet has been received within a defined period of time.

66. The method of claim 65, wherein the verifiable portion comprises at least a portion of a header or at least a portion of a preamble.

67. The method of claim 50, further comprising waking from a power save state at designated times to transmit the keep-alive messages.

68. An apparatus for wireless communication, comprising:
a receiver configured to receive packets from a wireless device, wherein the packets are received in accordance with a packet rate;
a transmitter configured to transmit keep-alive messages to the wireless device at a rate that is less than the packet rate; and
a keep-alive controller adapted to control the transmitter to transmit the keep-alive messages to the wireless device based on at least one criterion.

69. The apparatus of claim 68, wherein the packets comprise multicast packets.

70. The apparatus of claim 68, wherein the packets are received at substantially regular intervals of time.

71. The apparatus of claim 68, wherein the packets comprise a portion of a data stream.

72. The apparatus of claim 68, wherein the at least one criterion is based on the receiver receiving a message from the wireless device authorizing transmission of the keep-alive messages.

73. The apparatus of claim 68, further comprising a keep-alive controller configured to receive an indication from the wireless device that designates the rate for the transmission of the keep-alive messages.

74. The apparatus of claim 68, wherein the keep-alive messages are transmitted based on a transmission schedule received from the wireless device.

75. The apparatus of claim 74, wherein the transmission schedule comprises a packet period and a packet offset.

76. The apparatus of claim 74, wherein the transmission schedule defines different keep-alive transmission times for different wireless devices that are configured to transmit keep-alive messages.

77. The apparatus of claim 68, wherein the at least one criterion is based on a probability parameter.

78. The apparatus of claim 77, wherein the determination of whether to transmit the keep-alive messages comprises determining to not transmit a given one of the keep-alive messages based on comparison of the probability parameter with a probability threshold.

79. The apparatus of claim 68, wherein the keep-alive messages indicate an expectation to continue to listen for packets.

80. The apparatus of claim 68, wherein each of the keep-alive messages indicates receipt of packets and an expectation to continue to receive packets.

81. The apparatus of claim 68, wherein the at least one criterion is based on whether at least one packet has successfully been received by the receiver within a defined period of time.

82. The apparatus of claim 81, wherein the defined period of time comprises a window associated with a defined number of packets.

83. The apparatus of claim 68, wherein the at least one criterion is based on whether a verifiable portion of at least one packet has been received by the receiver within a defined period of time.

84. The apparatus of claim 83, wherein the verifiable portion comprises at least a portion of a header or at least a portion of a preamble.

85. The apparatus of claim 68, further comprising a mode controller configured to enable at least a portion of the apparatus to wake from a power save state at designated times to transmit the keep-alive messages.

86. An apparatus for wireless communication, comprising:
means for receiving packets from a wireless device, wherein the packets are received in accordance with a packet rate;
means for transmitting keep-alive messages to the wireless device at a rate that is less than the packet rate; and
means for controlling the transmitting means to transmit the keep-alive messages to the wireless device based on at least one criterion.

87. The apparatus of claim 86, wherein the packets comprise multicast packets.

88. The apparatus of claim 86, wherein the packets are received at substantially regular intervals of time.

89. The apparatus of claim 86, wherein the packets comprise a portion of a data stream.

90. The apparatus of claim 86, wherein the at least one criterion is based on the receiving means receiving a message from the wireless device authorizing transmission of the keep-alive messages.

91. The apparatus of claim 86, wherein the means for receiving receives an indication from the wireless device that designates the rate for the transmission of the keep-alive messages.

92. The apparatus of claim 86, wherein the keep-alive messages are transmitted based on a transmission schedule received from the wireless device.

93. The apparatus of claim 92, wherein the transmission schedule comprises a packet period and a packet offset.

94. The apparatus of claim 92, wherein the transmission schedule defines different keep-alive transmission times for different wireless devices that are configured to transmit keep-alive messages.

95. The apparatus of claim 86, wherein the at least one criterion is based on a probability parameter.

96. The apparatus of claim 95, wherein the determination of whether to transmit the keep-alive messages comprises determining to not transmit a given one of the keep-alive messages based on comparison of the probability parameter with a probability threshold.

97. The apparatus of claim 86, wherein the keep-alive messages indicate an expectation to continue to listen for packets.

98. The apparatus of claim 86, wherein each of the keep-alive messages indicates receipt of packets and an expectation to continue to receive packets.

99. The apparatus of claim 86, wherein the at least one criterion is based on whether at least one packet has successfully been received by the receiving means within a defined period of time.

100. The apparatus of claim 99, wherein the defined period of time comprises a window associated with a defined number of packets.

101. The apparatus of claim 86, wherein the at least one criterion is based on whether a verifiable portion of at least one packet has been received by the receiving means within a defined period of time.

102. The apparatus of claim 101, wherein the verifiable portion comprises at least a portion of a header or at least a portion of a preamble.

103. The apparatus of claim 86, further comprising means for waking from a power save state at designated times to transmit the keep-alive messages.

104. A computer-program product for wireless communication, comprising:
computer-readable medium comprising codes executable by at least one computer to:
receive packets from a wireless device, wherein the packets are received in accordance with a packet rate;
determine whether to transmit keep-alive messages to the wireless device based on at least one criterion; and
if the at least one criterion is satisfied, transmit keep-alive messages to the wireless device at a rate that is less than the packet rate.

105. A headset for wireless communication, comprising:
a receiver configured to receive packets from a wireless device, wherein the packets are received in accordance with a packet rate;
a transmitter configured to transmit keep-alive messages to the wireless device at a rate that is less than the packet rate;
a keep-alive controller adapted to control the transmitter to transmit the keep-alive messages to the wireless device based on at least one criterion; and
a transducer adapted to provide an audio output based on data received via the receiver.

106. A watch for wireless communication, comprising:
a receiver configured to receive packets from a wireless device, wherein the packets are received in accordance with a packet rate;
a transmitter configured to transmit keep-alive messages to the wireless device at a rate that is less than the packet rate;
a keep-alive controller adapted to control the transmitter to transmit the keep-alive messages to the wireless device based on at least one criterion; and
a user interface adapted to provide an indication based on data received via the receiver.

107. A sensing device for wireless communication, comprising:
a receiver configured to receive packets from a wireless device, wherein the packets are received in accordance with a packet rate;
a transmitter configured to transmit keep-alive messages to the wireless device at a rate that is less than the packet rate;
a keep-alive controller adapted to control the transmitter to transmit the keep-alive messages to the wireless device based on at least one criterion; and
a sensor adapted to provide data to be transmitted via the transmitter.

* * * * *